(No Model.)

S. MARKS.
SLATE FRAME.

No. 439,534. Patented Oct. 28, 1890.

WITNESSES,
S. A. Hageman
Eugene L. Lewis

INVENTOR,
Solomon Marks
By Jeptha Garrard
Atty

UNITED STATES PATENT OFFICE.

SOLOMON MARKS, OF CINCINNATI, OHIO.

SLATE-FRAME.

SPECIFICATION forming part of Letters Patent No. 439,534, dated October 28, 1890.

Application filed April 21, 1890. Serial No. 348,942. (No model.)

*To all whom it may concern:*

Be it known that I, SOLOMON MARKS, a citizen of the United States, residing at Cincinnati, in the county of Hamilton and State of Ohio, have invented a certain new and useful Improvement in Slate-Frames, of which the following is a specification, reference being had to the accompanying drawings.

My improvement consists in featurs of novelty hereinafter described and claimed.

Figure 1:
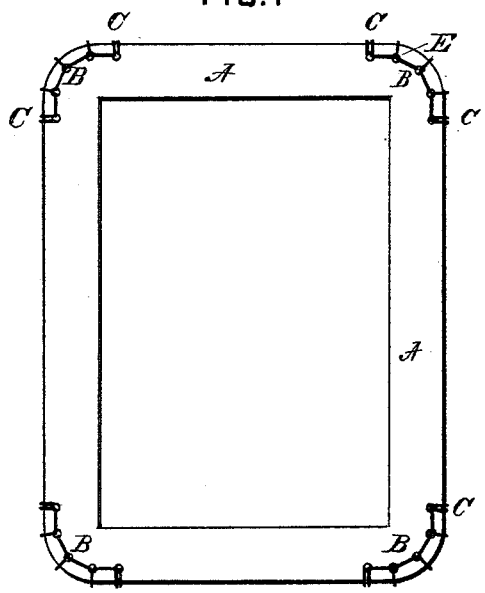
Figure 2:
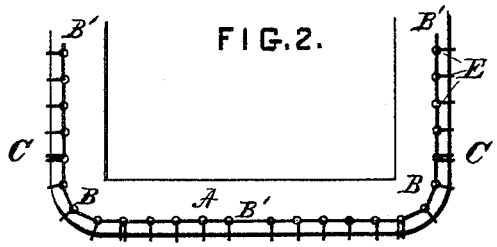
Figure 3:
Figure 4:

In the drawings, Figure 1 is a front view of a slate and frame carrying my device. Fig. 2 is a partial view differing from Fig. 1 only in that the cord and perforations are continuous about the entire periphery of the frame. Fig. 3 is a diagrammatic view of the cord, showing the manner of application of the cobbler-stitching. Fig. 4 is a similar view of the edge-stitching transverse of the frame of the slate.

A represents the frame of the slate as ordinarily constructed; B, the cord, and E the perforations through which it passes and by which it is retained in its place.

C shows a double loop of cord passing transversely of and around the outer edge of the slate-frame near each of the corners.

In Fig. 2, B' shows the cord extending continuously from one corner to the next.

The mode of construction is as follows: The frame is first bored or perforated in any manner, with holes of a suitable size in rows located at the corners and at the edges, as will be fully understood by reference to the drawings. The cord is then brought transversely around the edge of the frame at C, where it is desired to form the double loop, and both ends passed in opposite directions through the hole nearest that point. One of the ends is then brought a second time around the edge of the frame and passed again through the same holes, thus completing the double loop C. The two ends of the cord are then carried along the frame on opposite sides and passed in opposite directions through the next hole precisely as a cobbler sews with two threads, so as to form the ordinary cobbler's stitch, as shown at Fig. 3. When the cord is in place, it may be secured by a knot concealed in one of the holes, or by a peg, as is usual in such operations, the effect being that the line of cord B, lying upon the flat surfaces of the frame A on both sides, and the double loops C near each corner prevent the slate-frame from coming in contact with hard surfaces and avoid the noise incident thereto.

Beside forming a firm and lasting cushioning for a slate, my combined longitudinal cobbler-stitching and edge-stitching provides a binding whose stitches are secured in the same holes by friction, so as not to be liable to become loose and run out when either of the stitchings become severed.

I claim—

1. A slate-frame having a cushioning, substantially as herein shown and described, which consists of cobbler-stitching in line with the frame and edge-stitching looped over the outer edge of the frame and passed through the same holes as the cobbler-stitching, so as to produce frictional hold between the stitchings within the holes.

2. A slate-frame having a cushioning, substantially as herein shown and described, which consists of cobbler-stitching in line with the frame and edge-stitching looped over the outer edge of the frame at right angles to the cobbler-stitching and passed through the same holes as the cobbler-stitching, so as to produce frictional hold between the stitchings within the holes.

The foregoing specification of my invention signed by me this 11th day of April, A. D. 1890.

SOLOMON MARKS.

Witnesses:
PEIRCE Y. CADWALLADER,
E. L. LEWIS.